(12) United States Patent
Zhang (10) Patent No.: US 10,298,590 B2
(45) Date of Patent: May 21, 2019

(54) APPLICATION-BASED SERVICE PROVIDING METHOD, APPARATUS, AND SYSTEM

(71) Applicant: Tencent Technology (Shenzhen) Company Limited, Shenzhen, Guangdong (CN)

(72) Inventor: Jun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 153 days.

(21) Appl. No.: 15/196,798

(22) Filed: Jun. 29, 2016

(65) Prior Publication Data

US 2016/0308879 A1    Oct. 20, 2016

Related U.S. Application Data

(63) Continuation of application No. PCT/CN2015/072770, filed on Feb. 11, 2015.

(30) Foreign Application Priority Data

Feb. 11, 2014 (CN) .......................... 2014 1 0048005

(51) Int. Cl.
*H04L 29/08* (2006.01)
*H04L 29/06* (2006.01)
(Continued)

(52) U.S. Cl.
CPC .......... *H04L 63/102* (2013.01); *G06F 16/951* (2019.01); *H04L 67/025* (2013.01);
(Continued)

(58) Field of Classification Search
CPC .. H04W 4/001; G06F 17/30864; H04L 67/16; H04L 62/025
See application file for complete search history.

(56) References Cited

U.S. PATENT DOCUMENTS 7,913,187 B2    3/2011 Zhang
2005/0262449 A1    11/2005 Anderson et al.
(Continued)

FOREIGN PATENT DOCUMENTS

CN         1917529 A    2/2007
CN       101640602 A    2/2010
(Continued)

*Primary Examiner* — Ellen Tran
(74) *Attorney, Agent, or Firm* — Oblon, McClelland, Maier & Neustadt, L.L.P.

(57) ABSTRACT

The present disclosure discloses an application-based service providing method, apparatus, and system. The method includes: acquiring an application identifier of a currently running application; and searching a preset application-service relationship table for a service list corresponding to the application identifier, so as to provide a user of the application with a service in the service list, where the application-service relationship table includes a correspondence between an application identifier and a service list, and the service list includes at least one service. The service providing method in the embodiments decouples a third-party service from an application, and even if the application needs version update, the third-party service also does not need to depend on the version update of the application.

17 Claims, 5 Drawing Sheets

(51) Int. Cl.
*H04W 4/50* (2018.01)
*G06F 16/951* (2019.01)

(52) U.S. Cl.
CPC .............. *H04L 67/16* (2013.01); *H04L 67/42* (2013.01); *H04W 4/50* (2018.02)

(56) References Cited

U.S. PATENT DOCUMENTS

| | | | |
|---|---|---|---|
| 2006/0265337 A1* | 11/2006 | Wesinger, Jr. .......... | G06F 21/10 705/65 |
| 2009/0077242 A1* | 3/2009 | Lin ..................... | H04L 65/1063 709/227 |
| 2013/0282752 A1* | 10/2013 | Day-Richter .......... | G06F 21/62 707/769 |

FOREIGN PATENT DOCUMENTS

| | | | |
|---|---|---|---|
| CN | 103257866 A | 8/2013 |
| CN | 103399792 A | 11/2013 |
| CN | 104135504 A | 11/2014 |
| TW | 201235072 A | 9/2012 |

* cited by examiner

APPLICATION-BASED SERVICE PROVIDING METHOD, APPARATUS, AND SYSTEM

CROSS REFERENCE TO RELATED APPLICATION

This application is a continuation of International Application No. PCT/CN2015/072770, filed on Feb. 11, 2015, which claims priority to Chinese patent application No. 201410048005.1, filed on Feb. 11, 2014, the content of which are incorporated herein by reference in their entirety.

FIELD OF THE TECHNOLOGY

The present disclosure relates to the field of data processing, and in particular, to an application-based service providing method, apparatus, and system.

BACKGROUND OF THE DISCLOSURE

Figure 1:
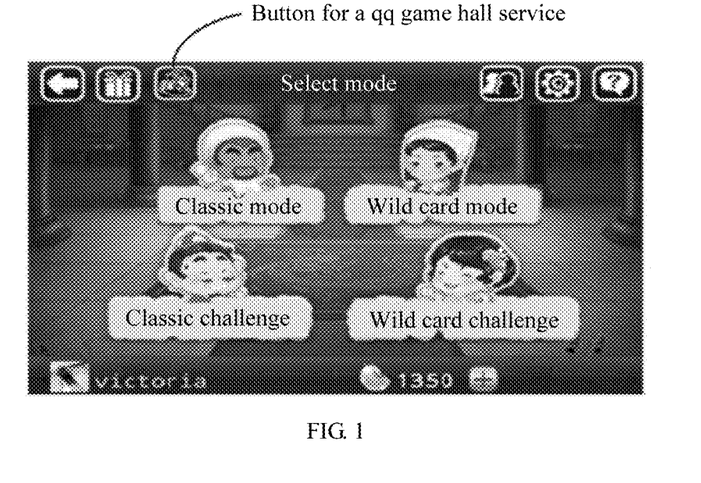
FIG. 1 is a schematic diagram of a qq game hall service in Huanle Dou Dizhu.

An application may also be referred to as an application program and is used for providing a user with complex content and functions. In order to enrich functions of an application, a third party can provide the application with a software development kit (SDK) applicable to the application, so as to provide users of the application with a third-party service. For example, a qq game hall service in Huanle Dou Dizhu (Happy Lord). Referring to FIG. 1, after Huanle Dou Dizhu is started, a button for the qq game hall service is shown. A user of Huanle Dou Dizhu can click the button for the qq game hall service to experience the qq game hall service.

However, in the foregoing method, a portal to the service provided by the third party is embedded in the application. When the application with the third-party service needs an operation such as version update, the third-party service also has to depend on synchronous update of the application, and otherwise, the provided service becomes abnormal.

SUMMARY

In view of the foregoing problem, the present disclosure provides an application-based service providing method, apparatus, and system, which can decouple an application from a third-party service, and even if the application needs version update, the third-party service also does not need to depend on version update of the application.

The present disclosure provides an application-based service providing method. The method includes:
  acquiring an application identifier of a currently running application; and
  searching a preset application-service relationship table for a service list corresponding to the application identifier, so as to provide a user of the application with a service in the service list, where the application-service relationship table includes a correspondence between an application identifier and a service list, and the service list includes at least one service.

Preferably, after the acquiring an application identifier of a currently running application and before the searching a preset application-service relationship table for a service list corresponding to the application identifier, so as to provide a user of the application with a service in the service list, the method further includes:
  determining whether an authority to use a service exists in the application identifier, and if yes, continuing to perform an operation of the searching a preset application-service relationship table for a service list corresponding to the application identifier.

Preferably, the method further includes:
  receiving a registration request, where the registration request includes the application identifier and the service list; and
  adding, to the application-service relationship table, the application identifier and the service list in the registration request.

Preferably, the method further includes:
  displaying a floating window on the application wherein the floating window serves as a service portal of the service list when the user accesses the service list.

Preferably, the method further includes:
  detecting, by the client with a preset frequency, whether currently a running application exists.

Besides, the present disclosure provides an application-based service providing apparatus. The apparatus includes: a processor; and a memory connected with processor, the memory including a plurality of program instructions executable by the processor, the plurality of program instructions including:
  a first acquisition module, configured to cause the processor to acquire an application identifier of a currently running application; and
  a search module, configured to cause the processor to search a preset application-service relationship table for a service list corresponding to the application identifier, so as to provide a user of the application with a service in the service list, where the application-service relationship table includes a correspondence between an application identifier and a service list, and the service list includes at least one service.

Preferably, the program instructions further include:
  a determination module, configured to cause the processor to determine whether an authority to use a service exists in the application identifier; and
  a trigger module, configured to cause the processor to trigger the search module when a result of the determination module is yes.

Preferably, the program instructions further include:
  a receiving module, configured to cause the processor to receive a registration request of the application, where the registration request includes the application identifier and the service list; and
  an addition module, configured to cause the processor to add, to the application-service relationship table, the application identifier and the service list in the registration request.

Preferably, the program instructions further include:
  a displaying module, configured to cause the processor to display a floating window on the application wherein the floating window serves as a service portal of the service list when the user accesses the service list.

Preferably, the program instructions further include:
  a detecting module, configured to cause the processor to detect, by a client with a preset frequency, whether the currently running application exists.

The present disclosure further provides a non-volatile computer storage media, wherein the non-volatile computer storage media stores at least one application program therein executable by an application-based service providing apparatus, and the at least one application program includes:
  a first acquisition module, configured to cause the application-based service providing apparatus to acquire an application identifier of a currently running application; and a search module, configured to cause the application-based service providing apparatus to search a preset application-service relationship table for a service list corresponding to the application identifier, so as to provide a user of the application with a service in the service list, wherein the application-service relationship table includes a correspondence between an application identifier and a service list, and the service list includes at least one service.

Preferably, the at least one application program further includes:

a determination module, configured to cause the application-based service providing apparatus to determine whether an authority to use a service exists in the application identifier; and a trigger module, configured to cause the application-based service providing apparatus to trigger the search module when a result of the determination module is yes.

Preferably, the at least one application program further includes:

a receiving module, configured to cause the application-based service providing apparatus to receive a registration request of the application, wherein the registration request includes the application identifier and the service list; and an addition module, configured to cause the application-based service providing apparatus to add, to the application-service relationship table, the application identifier and the service list in the registration request.

Preferably, the at least one application program further includes:

a displaying module, configured to cause the application-based service providing apparatus to display a floating window on the application wherein the floating window serves as a service portal of the service list when the user accesses the service list.

Preferably, the at least one application program further includes:

a detecting module, configured to cause the application-based service providing apparatus to detect, by a client with a preset frequency, whether the currently running application exists.

In the present disclosure, an application identifier of a currently running application is first acquired, and next, a service list corresponding to the application identifier is acquired from a preset application-service relationship table, so as to provide a user of the application with a service in the service list. Compared with the prior art, the service providing method in the embodiments enables a third-party service to be decoupled from the application, and even if the application needs version update, the third-party service also does not need to depend on the version update of the application.

BRIEF DESCRIPTION OF THE DRAWINGS

To describe the technical solutions of the embodiments of the present application more clearly, the accompanying drawings for illustrating the embodiments will be introduced briefly in the following. Apparently, the accompanying drawings in the following description are only some embodiments of the present application, and a person of ordinary skill in the art may obtain other drawings based on these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application without creative efforts shall fall within the protection scope of the present application.

Embodiment 1

Figure 2:
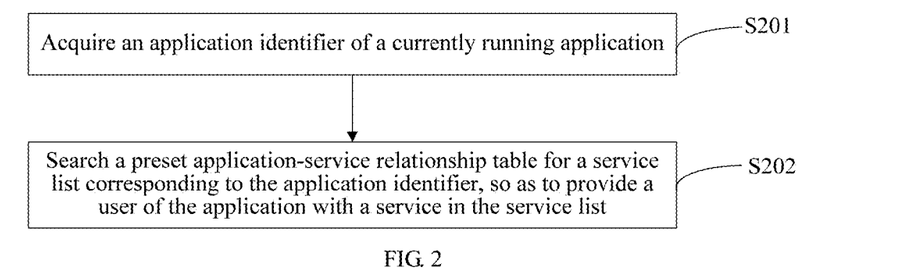
FIG. 2 is a flowchart of an application-based service providing method provided by the present disclosure.

Referring to FIG. 2, FIG. 2 is a flowchart of an application-based service providing method according to this embodiment, which may specifically include the following steps:

S201: Acquire an application identifier of a currently running application.

In this embodiment, if currently a running application exists, an application identifier of the application is acquired. The application identifier is used for identifying the application uniquely and may be a package name of the application, a character string assigned to the application in advance, or the like.

S202: Search a preset application-service relationship table for a service list corresponding to the application identifier, so as to provide a user of the application with a service in the service list.

The application-service relationship table includes a correspondence between an application identifier and a service list, and the service list includes at least one service.

During an actual operation, the application-service relationship table is set in advance, and when the application identifier is received, the application-service relationship table is searched for the service list corresponding to a received application identifier.

Besides, the application-service relationship table includes an application identifier of an application having an authority to use a service, so that before the search for the service list corresponding to a received application identifier, it may further first be determined whether the authority to use a service exists in the received application identifier in this embodiment. If the authority to use a service exists in the application identifier, the preset application-service relationship table may be searched for the service list corresponding to the application identifier. Specifically, an application that has successfully applied to a third-party server for a service in advance has the authority to use a service. The authority to use a service may be identified by using "0" and "1". When the received application identifier carries "0", it indicates that the application does not have the authority to use a service. Similarly, when the received application identifier carries "1", it indicates that the application has the authority to use a service and a subsequent operation may be performed.

In an actual application, for the setting of the application-service relationship table, a registration request may be first received from the application, where the registration request includes the application identifier and the service list. Next, the application identifier and the service list in the registration request are added to the application-service relationship table. In other words, only an application that requires a third party to provide a service sends the registration request, so as to request to provide the user of the application with a third-party service.

In this embodiment, an application identifier of a currently running application is first acquired, and next, a service list corresponding to the application identifier is acquired from a preset application-service relationship table, so as to provide a user of the application with a service in the service list. Compared with the prior art, the service providing method in this embodiment decouples a third-party service from an application, and even if the application needs version update, the third-party service also does not need to depend on the version update of the application.

Embodiment 2

Figure 3:
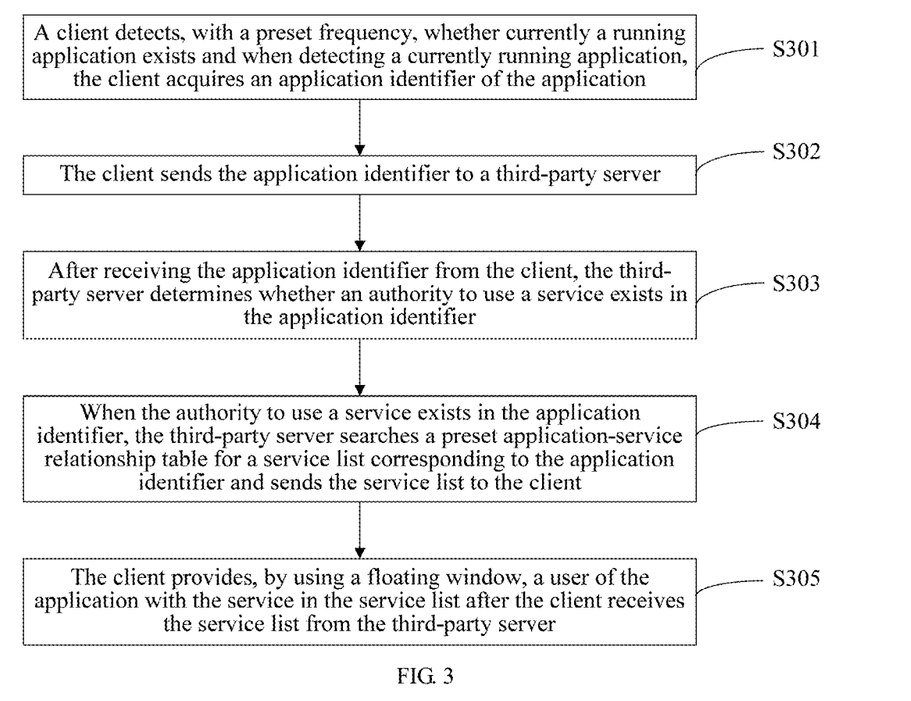
FIG. 3 is a flowchart of an application-based service providing method provided by the present disclosure.

Referring to FIG. 3, FIG. 3 is a flowchart of an application-based service providing method according to this embodiment. The method is applied to a client and a third-party server, and may specifically include:

S301: The client detects, with a preset frequency, whether currently a running application exists, and when detecting a currently running application, the client acquires an application identifier of the application.

The client mentioned in this embodiment of the present invention may be considered to be a smart phone, a tablet computer, a PC, or the like capable of running an application.

The preset frequency may be one second, or specifically, may also be manually set according to demands of a user.

Besides, the client may determine the running application by detecting an application existing in a task manager of a system. There may be one or more running applications. When detecting that multiple running applications exist currently, the client acquires application identifiers of the multiple detected applications.

S302: The client sends the application identifier to the third-party server.

In this embodiment, after acquiring the application identifier of the application, the client sends the application identifier to the third-party server.

S303: After receiving the application identifier from the client, the third-party server determines whether an authority to use a service exists in the application identifier.

Because an application that gets a service of the third-party server needs to be authorized by the third-party server in advance, after receiving the application identifier from the client, the third-party server first determines whether the authority to use a service exists in a received application identifier.

Specifically, an application identifier of the application authorized by the third-party server may be stored in the third-party server in advance. After receiving the application identifier from the client, the third-party server finds out whether the application identifier has been stored in the third-party server in advance, and if yes, the authority to use a service exists in the application identifier, or otherwise, the third-party server may return a request failure packet to the client.

S304: When the authority to use a service exists in the application identifier, the third-party server searches a preset application-service relationship table for a service list corresponding to the application identifier and sends the service list to the client.

The application-service relationship table includes a correspondence between an application identifier and a service list, and the service list includes at least one service.

In this embodiment, the third-party server establishes the application-service relationship table by receiving a registration request from the client, where the registration request sent by the client includes the application identifier and the service list corresponding to the application identifier. In other words, the client requests a third-party service for the application by sending the registration request to the third-party server.

During an actual operation, if the authority to use a service exists in a received application identifier, the third-party server searches the preset application-service relationship table for the service list corresponding to the application identifier, so as to determine to provide the third-party service for the application corresponding to the application identifier. After acquiring the service list, the third-party server sends the service list to the client.

S305: The client provides a user of the application with a service in the service list by using a floating window after the client receives the service list from the third-party server. A displaying module is configured to cause the processor to display a floating window on the application wherein the floating window serves as a service portal of the service list when the user accesses the service list.

In this embodiment, after receiving the service list from the third-party server, the client may display the service in the service list to the user of the application.

In an actual application, after receiving the service list from the third-party server, the client may invoke a window management component interface of a system to display the floating window at an upper layer of the application. When the user of the application clicks the floating window, services in the service list may be displayed and the user gets the third-party service by clicking an icon for each service.

The application-based service providing method provided by this embodiment is applied to a client and the third-party server. When needing to provide the user of the running application with a third-party service, the client directly sends the application identifier of the application to the third-party server, so that the service list corresponding to the application is acquired to provide the user with the third-party service.

Further, when using a third-party service, a user does not need to exit a currently accessed application.

Embodiment 3

Figure 4:
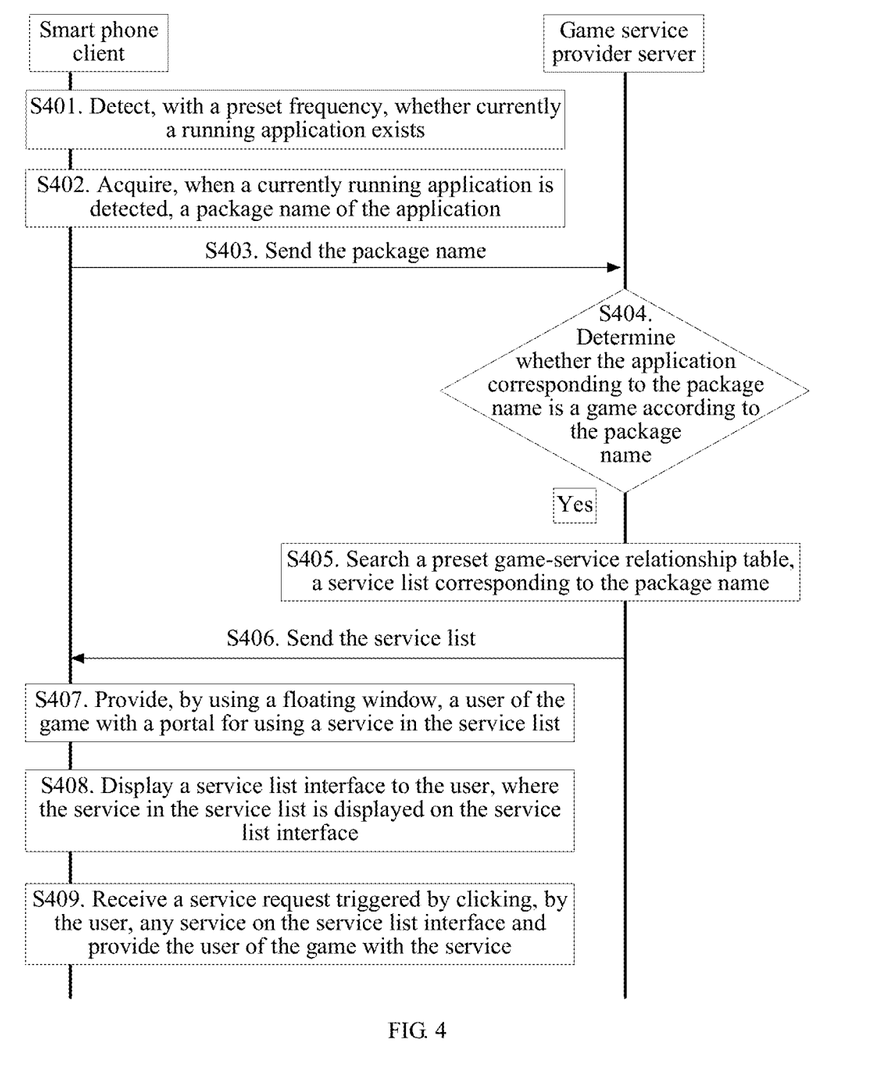
FIG. 4 is an interaction diagram of a mobile game-based service providing method provided by the present disclosure.

Referring to FIG. 4, FIG. 4 is an interaction diagram of a mobile game-based service providing method provided by this embodiment. The method is applied to a smart phone client and a game service provider server, and may specifically include:

S401: The smart phone client detects, with a preset frequency, whether currently a running application exists.

S402: When detecting a currently running application, the smart phone client acquires a package name of the application.

S403: Send the package name to the game service provider server.

S404: After receiving the package name from the smart phone client, the game service provider server determines, according to the package name, whether the application corresponding to the package name is a game.

S405: If the application corresponding to the package name is a game, the game service provider server searches a preset game-service relationship table for a service list corresponding to the package name.

The service list may include a game booster service, a game guide service, a game forum service, and the like.

S406: The game service provider server sends the service list to the smart phone client.

S407: After receiving the service list from the game service provider server, the smart phone client provides, by using a floating window, a user of the game with a portal for using a service in the service list.

S408: After receiving, from the user of the game, a request of displaying the service list, the smart phone client displays a service list interface to the user, where the service in the service list is displayed on the service list interface.

Figure 5:
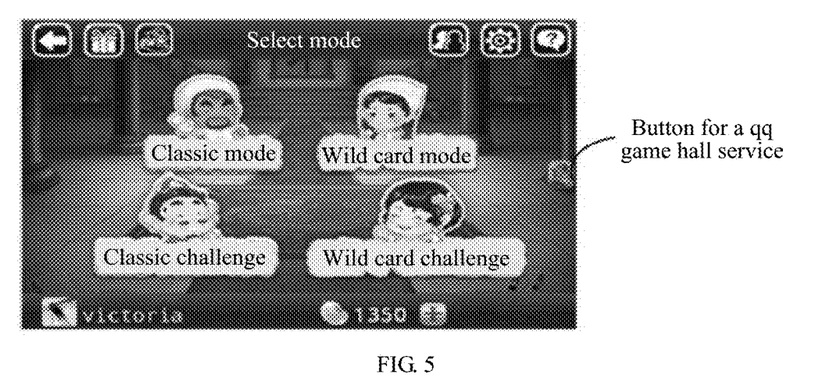
FIG. 5 is a schematic diagram of a floating window service portal in the game Huanle Dou Dizhu provided by the present disclosure.
Figure 6:
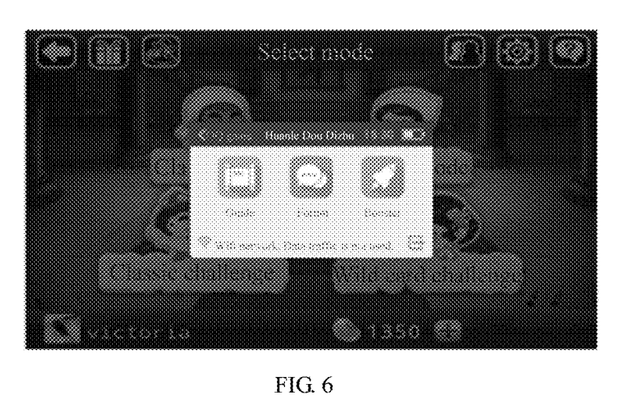
FIG. 6 is a schematic diagram of a displaying a service list interface in the game Huanle Dou Dizhu provided by the present disclosure.

Referring to FIG. 5, FIG. 5 is a schematic diagram of a floating window service portal in the game Huanle Dou Dizhu. The user of the game may enter the service list interface by clicking the service portal. As shown in FIG. 6, FIG. 6 is a schematic diagram of displaying a service list interface in the game Huanle Dou Dizhu. The service list interface in FIG. 6 sequentially displays a game guide service, a game forum service, and a game booster service. Specifically, the service list interface may further display a traffic monitoring service and a battery level alarm service provided locally.

S409: The smart phone client receives a service request triggered by clicking, by the user, any service on the service list interface and provides the user of the game with the service.

In this embodiment, a user of a game may be provided with a service that can be provided by a game service provider server, for example, a game booster service, a game guide service, or a game forum service; at the same time, a local service, for example, a traffic monitoring service or a battery level alarm service, may further be provided. When a third-party service of a game service provider needs to be provided, the smart phone client sends the service request to the game service provider server, and after receiving the service request from the smart phone client, the game service provider server provides the user of the game with the service. When the local service needs to be provided, the smart phone client may directly invoke the local service according to the service request.

The mobile game-based service providing method provided by this embodiment is applied to a smart phone client and a game service provider server. When needing to provide a user of a running game with a third-party service, the smart phone client directly sends an application identifier of the game to the game service provider server, so that a service list corresponding to the game may be acquired to provide the user with the third-party service.

Further, when using a third-party service, a user does not need to exit a currently running game.

Embodiment 4

Figure 7:
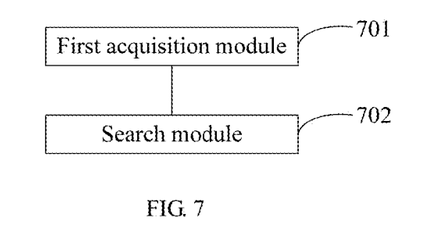
FIG. 7 is a structural diagram of an application-based service providing apparatus provided by the present disclosure.

Referring to FIG. 7, FIG. 7 is a structural diagram of an application-based service providing apparatus according to this embodiment. The apparatus may include: a first acquisition module 701 and a search module 702.

The first acquisition module 701 is configured to acquire an application identifier of a currently running application; and the search module 702 is configured to search a preset application-service relationship table for a service list corresponding to the application identifier, so as to provide a user of the application with a service in the service list, where the application-service relationship table includes a correspondence between an application identifier and a service list, and the service list includes at least one service.

In some embodiments of the present invention, the apparatus may further include:

a determination module, configured to determine whether an authority to use a service exists in the application identifier; and a trigger module, configured to trigger the search module when a result of the determination module is yes.

In some embodiments of the present invention, the apparatus may further include:

a receiving module, configured to receive a registration request of the application, where the registration request includes the application identifier and the service list; and an addition module, configured to add, to the application-service relationship table, the application identifier and the service list in the registration request.

It may be understood that, a function of each functional module of an application-based service providing apparatus in this embodiment may be specifically implemented according to the methods in the foregoing method embodiments. Reference may be made to related description of the foregoing method embodiments for a specific implementation process of the function, which is not further described herein.

Figure 8:
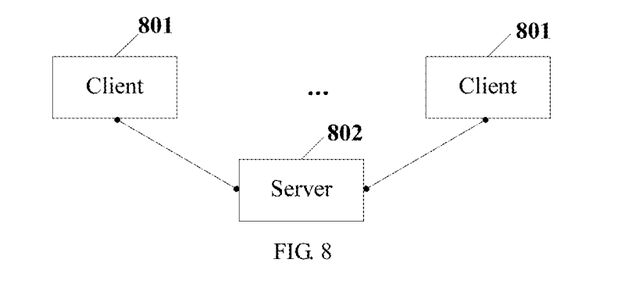
FIG. 8 is a structural diagram of an application-based service providing system provided by the present disclosure.

Referring to FIG. 8, FIG. 8 is a structural diagram of an application-based service providing system according to this embodiment. The system includes a client 801 and a server 802;

the client 801 is configured to detect, with a preset frequency, whether currently a running application exists, acquire an application identifier of the application, and send the application identifier to the server;

the server 802 is configured to search, after the application identifier from the client is received, a preset application-service relationship table for a service list corresponding to the application identifier, and send the service list to the client, where the application-service relationship table includes a correspondence between an application identifier and a service list, and the service list includes at least one service; and the client 801 is configured to display a floating window on the application wherein the floating window serves as a service portal of the service list when the user accesses the service list.

Figure 9:
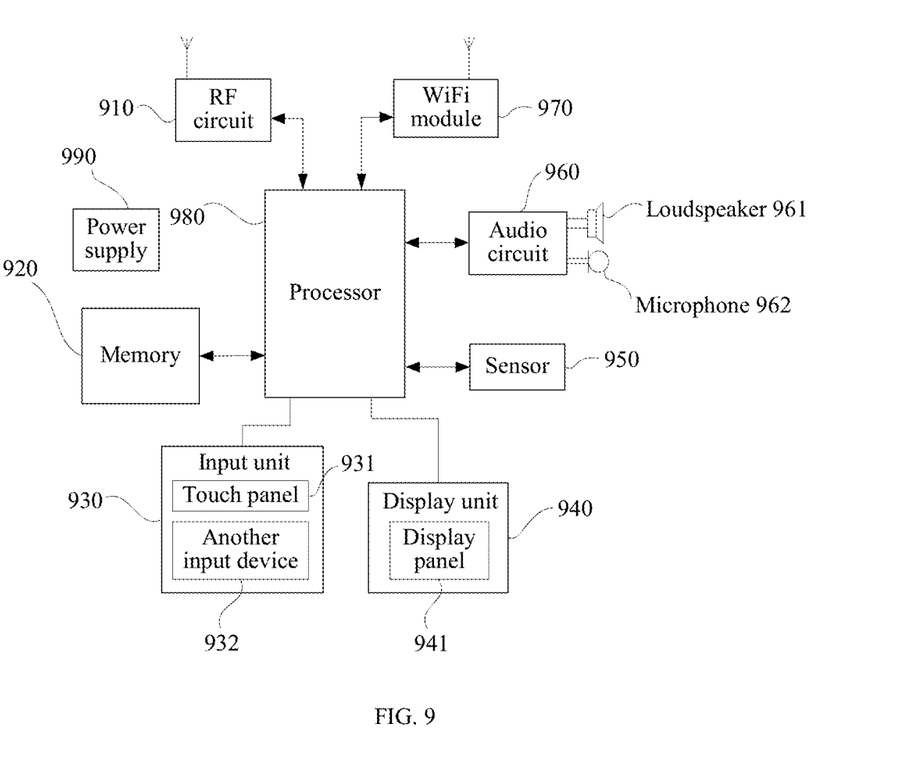
FIG. 9 is a block diagram of a partial structure of a mobile phone related to a terminal provided by the present disclosure.

An embodiment of the present invention further provides a terminal. As shown in FIG. 9, for ease of description, only a part related to the embodiment of the present invention is shown. For specific technical details that are not disclosed, reference may be made to the method part of the embodiments of the present invention. The terminal may be any terminal device such as a mobile phone, a tablet computer, a Personal Digital Assistant (PDA), a Point of Sales (POS), a vehicle-mounted computer. For example, the terminal is a mobile phone:

FIG. 9 is a block diagram of a partial structure of a mobile phone related to a terminal provided by the embodiment of the present invention. Referring to FIG. 9, the mobile phone includes parts such as a radio frequency (RF) circuit 910, a memory 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 9 does not constitute a limitation to the mobile phone, and the mobile phone may include more parts or fewer parts than those shown in the figure, or some parts may be combined, or a different part arrangement may be used.

The following specifically describes each constituent part of the mobile phone with reference to FIG. 9:

The RF circuit 910 may be used to receive and send information or receive and send a signal during a call, and in particular, after receiving downlink information of a base station, hand over the downlink information to a processor 980 for processing; and in addition, send related uplink data to the base station. Generally, the RF circuit includes, but is not limited to, an antenna, at least one amplifier, a transceiver, a coupler, a low noise amplifier (LAN), a duplexer, and the like.

In addition, the RF circuit 910 may further communicate with a network and another device by using wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, a short messaging service (SMS), and the like.

The memory 920 may be configured to store a software program and a module, and the processor 980 runs the software program and the module stored in the memory 920 to implement various functional applications and data processing of a mobile phone. The memory 920 may mainly include a program storage area and a data storage area. The program storage area can store an operating system, an application program required by at least one function (such as a voice playback function and an image playback function), and the like. The data storage area may store data (such as audio data and an address book) created according to use of the mobile phone. In addition, the memory 920 may include a high speed random access memory, and may also include a non-volatile memory, such as at least one magnetic disk storage device, a flash memory, or another volatile solid-state storage device.

The input unit 930 may be configured to receive input number or character information, and generate a key signal input related to the user setting and function control of the mobile phone 900. Specifically, the input unit 930 may include a touch control panel 931 and another input device 932. The touch control panel 931 may also be referred to as a touch screen, and may collect a touch operation of a user on or near the touch control panel (such as an operation on the touch control panel 931 or an operation near the touch control panel 931 that is performed by a user by using any suitable object or attachment, such as a finger or a stylus), and drive a corresponding connection apparatus by using a preset program. Optionally, the touch control panel 931 may include two parts: a touch detection apparatus and a touch controller. The touch detection apparatus detects a touch position of a user, detects a signal generated by a touch operation, and sends the signal to the touch controller. The touch controller receives touch information from the touch detection apparatus, converts the touch information into contact coordinates, sends the contact coordinates to the processor 980, receives a command sent by the processor 980, and executes the command. In addition, the touch control panel 931 may be implemented by using various types, such as a resistive type, a capacitive type, an infrared type, and a surface acoustic wave type. Besides the touch control panel 931, the input unit 930 may further include the another input device 932. Specifically, the another input device 932 may include, but is not limited to, one or more of a physical keyboard, a functional key (such as a volume control key and a switch key), a trackball, a mouse, and a joystick.

The display unit 940 may be configured to display information input by a user or information provided to a user, and various menus of the mobile phone. The display unit 940 may include a display panel 941. Optionally, the display panel 941 may be configured in the form of a liquid crystal display (LCD), an organic light-emitting diode (OLED), or the like. Further, the touch control panel 931 may cover the display panel 941. After detecting a touch operation on or near the touch control panel 931, the touch control panel 931 transfers the touch operation to the processor 980, so as to determine a type of a touch event. Subsequently, the processor 980 provides corresponding visual output on the display panel 941 according to the type of the touch event. In FIG. 9, the touch control panel 931 and the display panel 941 are used as two separate parts to implement input and output functions of the mobile phone; however, in some embodiments, the touch control panel 931 and the display panel 941 may be integrated to implement the input and output functions of the mobile phone.

The mobile phone 900 may further include at least one sensor 950, for example, an optical sensor, a motion sensor, and other sensors. Specifically, the optical sensor may include an ambient light sensor and a proximity sensor, where the ambient light sensor may adjust the luminance of the display panel 941 according to brightness of the ambient light, and the proximity sensor may switch off the display panel 941 and/or backlight when the mobile phone is moved near an ear. As one type of the motion sensor, a gravity acceleration sensor may detect the magnitude of accelerations in various directions (which generally are triaxial), may detect the magnitude and direction of the gravity when the sensor is still, may be used in an application for identifying a gesture of a mobile phone (for example, switching between landscape and portrait modes, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the mobile phone are not further described herein.

The audio circuit 960, a loudspeaker 961, and a microphone 962 may provide audio interfaces between the user and the mobile phone. The audio circuit 960 may transmit, to the loudspeaker 961, a received electric signal converted from received audio data. The loudspeaker 961 converts the electrical signal into a sound signal for output. On the other hand, the microphone 962 converts a collected sound signal into an electrical signal. The audio circuit 960 receives the electrical signal and converts the electrical signal into audio data, outputs the audio data to the processor 980 for processing. Next, the processor 980 sends the audio data to another mobile phone by using the RF circuit 910, or outputs the audio data to the memory 920 for further processing.

WiFi belongs to a short range wireless transmission technology. The mobile phone may help, by using a WiFi module 970, the user receive and send an e-mail, browse a webpage, access a streaming medium, and the like, and WiFi provides the user with wireless broadband Internet access. Although FIG. 9 shows the WiFi module 970, it may be understood that, the WiFi module 970 is not an essential part of the mobile phone 900, and can be completely omitted as required without changing the nature of the present disclosure.

The processor 980 is a control center of the mobile phone, and connects various parts of a whole mobile phone by using various interfaces and circuits. By running or executing the software program and/or the module stored in the memory 920 and invoking data stored in the memory 920, the processor 980 performs various functions and data processing of the mobile phone, thereby performing overall monitoring on the mobile phone. Optionally, the processor 980 may include one or more processing units. Preferably, the processor 980 may integrate an application processor and a modem. The application processor mainly processes an operating system, a user interface, an application program, and the like, and the modem mainly processes wireless communication. It may be understood that, the foregoing modem may also be not integrated into the processor 980.

The mobile phone 900 further includes the power supply 990 (such as a battery) for supplying power to the components. Preferably, the power supply may be logically connected to the processor 980 by using a power management system, thereby implementing functions such as charging, discharging, and power consumption management by using the power management system.

Although not shown in the figure, the mobile phone 900 may further include a camera, a Bluetooth module, and the like, which are not further described herein.

Specifically, in this embodiment, the processor 980 in the terminal follows the following instructions to load an executable file progress corresponding to one or more application programs to the memory 920 and runs the application program stored in the memory 920, thereby implementing various functions:

acquiring an application identifier of a currently running application; and searching a preset application-service relationship table for a service list corresponding to the application identifier, so as to provide a user of the application with a service in the service list, where the application-service relationship table includes a correspondence between an application identifier and a service list, and the service list includes at least one service.

Further, after the acquiring an application identifier of a currently running application and before the searching a preset application-service relationship table for a service list corresponding to the application identifier, so as to provide a user of the application with a service in the service list, the following function is included:

determining whether an authority to use a service exists in the application identifier, and if yes, continuing to perform an operation of the searching a preset application-service relationship table for a service list corresponding to the application identifier.

Further, the method further includes:

receiving a registration request, where the registration request includes the application identifier and the service list; and adding, to the application-service relationship table, the application identifier and the service list in the registration request.

Further, the method further includes:

displaying a floating window on the application wherein the floating window serves as a service portal of the service list when the user accesses the service list.

Further, the method further includes:

detecting, by the client with a preset frequency, whether currently a running application exists.

Compared with the prior art, the application-based service providing apparatus and system provided by the embodiments decouples a third-party service from an application, and even if the application needs version update, the third-party service also does not need to depend on version update of the application.

The apparatus embodiments are substantially similar to the method embodiments and therefore, reference may be made to the part of description of the method embodiments for related parts. The apparatus embodiments described in the foregoing are merely exemplary. The units described as separate parts may be or may be not physically separate. The part shown as a unit may be or may be not a physical unit, that is, may be located at one place or distributed on multiple network units. Some or all of modules may be selected to achieve the objective of the embodiment solutions according to an actual need. A person of ordinary skill in the art may understand and carry out the solutions without creative efforts.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, a process, a method, an object, or a device that includes a series of elements not only includes such elements, but also includes other elements not specified expressly, or may include inherent elements of the process, method, object, or device. Unless otherwise specified, an element limited by "include a/an . . . " does not exclude other same elements existing in the process, the method, the object, or the device that includes the element.

An application-based service providing method, apparatus, and system according to the embodiments of the present invention are described in detail above. Specific examples are used herein to illustrate the principle and implementation manner of the present disclosure, and the description of the foregoing embodiments is merely to help to understand the methods and core ideas of the present disclosure. Besides, for a person of ordinary skill in the art, according to the idea of the present disclosure, there are changes in the specific implementation manners and application scope, and in conclusion, content of the present specification should not be understood as a limitation on the present disclosure.

What is claimed is:

1. An application-based service providing method that is performed by a system comprising a client and a server, wherein the method comprises:

acquiring, by the client, an application identifier of a currently running application in the client;

sending, by the client, the application identifier to a server;

searching, by the server, a preset application-service relationship table for a web service list in the server corresponding to the application identifier, so that the server provides a user of the application of the client with the web service list irrespective of a version of the currently running application, wherein the preset application-service relationship table of the server comprises a correspondence between the application identifier of the application and the web service list, and the web service list of the server comprises at least one user selectable service; and displaying, by the client, a user interface that includes the at least one user selectable service, the user interface being superimposed on the currently running application; and providing, by the client device, one of the at least one user selectable service in response to a user selection of the one of the at least one user selectable service via the user interface.

2. The method according to claim 1, after acquiring, by the client, the application identifier of the currently running application in the client and before searching, by the server, the preset application-service relationship table for the web service list in the server corresponding to the application identifier, the method further comprising:

determining, by the server, whether an authority to use a service exists in the application identifier, and if yes, continuing to perform an operation of the searching the preset application-service relationship table for the web service list corresponding to the application identifier.

3. The method according to claim 1, wherein the method further comprises:

adding, by the server, to the application-service relationship table, the application identifier and the web service list in a registration request.

4. The method according to claim 1, wherein the displaying the user interface comprises:

displaying, by the client, a floating window on the application wherein the floating window serves as a service portal of the web service list when the user accesses the web service list.

5. The method according to claim 4, wherein the method further comprises:

detecting, by the client with a preset frequency, whether the currently running application exists.

6. The method according to claim 1, wherein
the currently running application is a game; and
the at least one user selectable service is associated with the game.

7. The method according to claim 1, wherein
the acquiring the application identifier includes acquiring application identifiers for a plurality of currently running applications on the client;
the sending the application identifier includes sending the application identifiers to the server;
the search the preset application-service relationship table includes searching the preset application-service relationship table for a web service list for each of the application identifiers; and
the user interface includes a plurality of user selectable services identified by the web service lists for the application identifiers.

8. An application-based service providing apparatus, wherein the apparatus comprises:
a processor; and
a memory connected with the processor, the memory comprising a plurality of program instructions executable by the processor, the plurality of program instructions comprising:
a first acquisition module, configured to cause the processor to acquire an application identifier of a currently running application on a client;

a search module, configured to cause the processor to search a preset application-service relationship table for a web service list corresponding to the application identifier, so as to provide a user of the application with the web service list, wherein the application-service relationship table comprises a correspondence between the application identifier and the web service list, and the web service list comprises at least one user selectable service; and an output module, configured to cause the processor to provide the user of the application with the web service list irrespective of a version of the currently running application.

9. The apparatus according to claim 8, wherein the program instructions further comprise:
a determination module, configured to cause the processor to determine whether an authority to use a service exists in the application identifier; and
a trigger module, configured to cause the processor to trigger the search module when a result of the determination module is yes.

10. The apparatus according to claim 8, wherein the program instructions further comprise:
an addition module, configured to cause the processor to add, to the application-service relationship table, the application identifier and the web service list in a registration request.

11. The apparatus according to claim 8, wherein
a floating window is displayed by the client on the application and the floating window serves as a service portal of the web service list when the user accesses the web service list.

12. The apparatus according to claim 11, wherein
whether the currently running application exists is detected by the client with a preset frequency.

13. A non-transitory computer readable storage medium, storing instructions which when executed by a processor cause the processor to perform:
acquiring an application identifier of a currently running application on a client;
searching a preset application-service relationship table for a web service list corresponding to the application identifier, so as to provide a user of the application with the web service list, wherein the application-service relationship table comprises a correspondence between the application identifier and the web service list, and the web service list comprises at least one user selectable service; and
providing the user of the application with the web service list irrespective of a version of the currently running application.

14. The non-transitory computer readable storage medium according to claim 13, wherein the instructions when executed by the processor further cause the processor to perform:
determining whether an authority to use a service exists in the application identifier; and
triggering the searching when a result of the determination module is yes.

15. The non-transitory computer readable storage medium according to claim 13, wherein the instructions when executed by the processor further cause the processor to perform:
adding, to the application-service relationship table, the application identifier and the web service list in a registration request.

16. The non-transitory computer readable storage medium according to claim 13, wherein
a a floating window is displayed by the client on the application and the floating window serves as a service portal of the web service list when the user accesses the web service list.

17. The non-transitory computer readable storage medium according to claim 16, wherein
whether the currently running application exists is detected by the client with a preset frequency.

* * * * *